Figure 1:
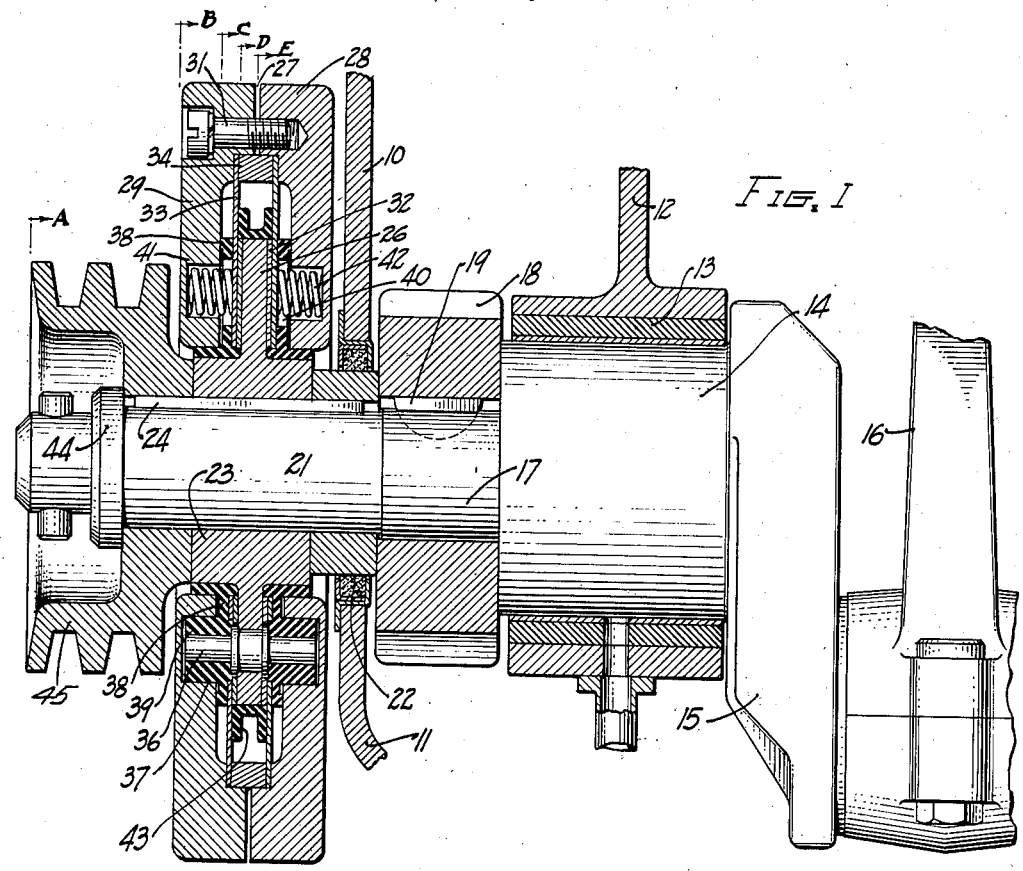

Oct. 11, 1932.  W. R. GRISWOLD  1,882,281
INTERNAL COMBUSTION ENGINE
Filed Sept. 23, 1930

Inventor
WALTER R. GRISWOLD
By
Attorney

Patented Oct. 11, 1932

1,882,281

UNITED STATES PATENT OFFICE

WALTER R. GRISWOLD, OF DETROIT, MICHIGAN, ASSIGNOR TO PACKARD MOTOR CAR COMPANY, OF DETROIT, MICHIGAN, A CORPORATION OF MICHIGAN

INTERNAL COMBUSTION ENGINE

Application filed September 23, 1930. Serial No. 483,881.

This invention relates to internal combustion engines and more particularly to means for controlling torsional vibration in the crank shafts of such engines.

It has for one of its objects to provide a simple and effective device to damp such torsional vibration, in which the damping effect is secured partly by mechanical friction and partly by internal molecular friction or hysteresis.

Another object of the invention is to provide a vibration damper of the character designed having enclosed resilient means for increasing the mechanical friction damping, the friction surfaces being enclosed and protected by the hysteresis means.

Another object of the invention is to provide a vibration damper having cooperating friction members, the friction surfaces of which are enclosed in rubber, provided with spring means for increasing the contact pressure between said surfaces.

A further object of the invention is to provide a vibration damper having both mechanical friction and hysteresis damping devices assembled in a unit adapted to support an inertia member, and having devices carried by the inertia member to increase the damping friction of said mechanical devices.

Figure 2:
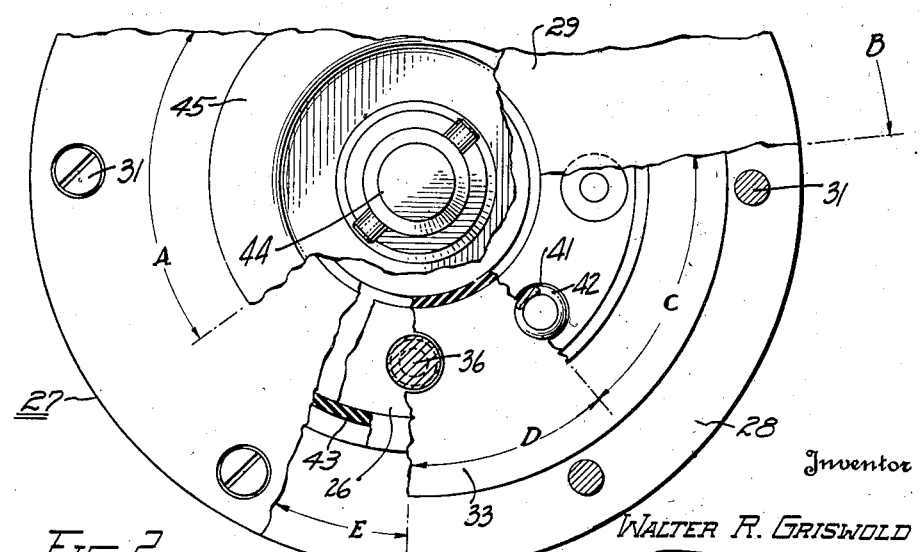

Other objects of the invention will appear from the following description taken in connection with the drawing, which forms a part of this specification, and in which:

Fig. 1 is a longitudinal vertical section through part of an internal combustion engine provided with a vibration damper constructed in accordance with this invention, and Fig. 2 is a view to a larger scale in front elevation and partially broken away in several sections, designated by the arrows A, B, C, D and E, which sections are respectively taken substantially on the corresponding lines A, B, C, D and E of Fig. 1.

Referring to the drawing, in Fig. 1 at 10 is represented the crank case of an internal combustion engine, having a lower cover or oil pan 11 and provided with transverse webs, such as shown at 12. These webs support suitable aligned bearings 13 for an engine crank shaft 14, which has the usual integral cranks 15, each of which is connected by a connecting rod 16 to a piston mounted in one of the engine cylinders. The piston and cylinder are not shown in the drawing, but are of usual construction.

Forwardly of the first bearing 13, the crank shaft 14 is preferably formed with a reduced portion 17, on which a gear or chain sprocket 18 may be keyed or otherwise secured as indicated at 19, and used to drive the engine cam shaft or other engine accessories, which are not shown in the drawing. Forwardly of the sprocket 18, the crank shaft is preferably further reduced in section as shown at 21, and projects through a suitable opening 22 in the front wall of the crank case 10.

The damping means of this invention is illustrated as mounted at or adjacent the end of the crank shaft 14. It comprises a supporting portion or hub 23, keyed or otherwise rigidly secured to the crank shaft on the reduced portion 21 thereof, as indicated at 24, which hub has a radially disposed integral flange 26. Surrounding the hub 23 and concentric with the crank shaft axis is a weight or inertia member 27, formed in two parts, each of which has a rim portion 28 and a web portion 29, these portions being removably secured together in any convenient manner as by clamp bolts 31. These members, the hub 23 and the inertia member 27, constitute the relatively movable damper members, between and to which the damping devices are connected.

The mechanical friction damping means comprises a pair of annular friction devices or disks 32 which surround the hub 23 on either side of, and in frictional contact with the side faces of the hub flange 26. These disks are also in contact with members which are connected to and share the motion of the inertia member 27 and which are shown as comprising a pair of friction plates 33, the outer edges of which are clamped between the parts of the inertia member 27. For this purpose they are separated at their periphery by a circumferential spacing member 34, substantially of the same thickness as the combined thickness of the flange 26 and the disks 32. In this way the plates are rigidly connected to the inertia member 27 and are disposed in parallel relation on either side of the flange 26. It will be evident that the friction disks 32 are thus subjected to a rubbing action caused by relative movement between the plates 33 and the flange 26, and accordingly cause mechanical friction and hence damping.

The flange 26 is provided with a circular row of axially disposed pins 36, which are preferably permanently secured thereto by upsetting flanges thereon as clearly shown in Fig. 1. The oppositely disposed ends of the pins 36 project into circular recesses 37 formed in the web portions 29 of the inertia member 27. Disposed around the hub 23 on either side of the flange 26, and in contact with the plates 33 is an annular ring 38 of elastically deformable material such as rubber, or any other suitable material which is subjected to a considerable hysteresis loss when put through a cycle of compression and expansion. This rubber member 38 constitutes the hysteresis damping member of this invention. It is provided at spaced intervals with circular projections or knobs 39, which are adapted to surround and tightly embrace the pins 36, and to project into the recesses 37. These members 38 are preferably permanently secured to the friction plates 33, the pins 36, the flange 26 and the hub member 23, as by being vulcanized thereto, but are not secured in any way to the inertia members 29 except by being compressed therebetween.

The rings 38 are also provided with a circular row of holes or cut-away portions 40, disposed between adjacent pins 36, through which holes portions of the outer surface of the plates 33 are exposed.

The web portion 29 of each of the inertia members is formed with axially disposed cylindrical recesses 41, which open inwardly or toward the plates 33, arranged in a circular row intermediate the pins 36 and each coaxial with one of the holes 40. Fitted in each of these recesses is a suitable compression member such as a coil spring 42, which springs bear at their ends on the exposed portions of the plates 33, passing for this purpose through the hole 40. In this way the plates 33 are urged toward the flange 26, increasing the pressure on both faces on the friction disk 32, and with it the damping friction.

It will be evident that upon relative movement between the inertia member 27 and the shaft with its hub member 23, a part of the rubber members, and more especially the knobs 39 thereof, will be forced to partake of the movement of the shaft through the flange 26 and the pins 36, while other portions of these rubber members will be compelled to move with the inertia member through the recesses or depressions 37. Thus it is clear that these rubber members will be considerably distorted, causing a considerable loss of energy by hysteresis or internal friction, with resulting damping.

The rubber members 38 with their lugs 39 also serve other purposes. Being possessed of considerable resilience they continuously exert a pressure tending to return the inertia member 27 to its neutral position with respect to the hub 23, thus acting to restore the device to its original condition after any displacement thereof caused by vibration.

Also, since the friction disks 32 and their cooperating friction surfaces are completely enclosed within the elastic members 38, these surfaces are thoroughly protected from moisture, dirt, oil and other foreign matter affecting their friction values. To complete the enclosure of the friction surfaces, an additional peripheral strip or cover rubber 43 may be vulcanized between the plates 33. Because of this protection, the friction, and accordingly the damping effect at any particular engine speed remains substantially constant, being unaffected by conditions extraneous to the damper.

It will be observed that the damper hub and its flange and pins, the plates 33, the friction disks 32, and the rubber elements, may be conveniently permanently secured into an assembled unit, the parts being retained in position by reason of the rubber which forms the cover. This unit can be easily replaced in the event of wear or accidental damage, it being only necessary to clamp the unit in place between the halves of the inertia member, and secure these upon the end of the shaft in any convenient way. As illustrated, this is accomplished by means of a nut 44, which may also be used to retain on the shaft any necessary driving member, such as the fan pulley 45. The friction disks 32 are thus permitted to float in frictional engagement with and between the cooperating flange and the friction plates, while completely enclosed in the rubber damping member 38.

While a specific embodiment of the invention has been herein described, which is deemed to be new and advantageous and may be specifically claimed, it is not to be understood that the invention is limited to the exact details of the construction, as it will be apparent that changes may be made therein without departing from the spirit or scope of the invention.

Having thus described the invention, what is claimed and desired to be secured by Letters Patent is:

1. A vibration damper for a shaft having an inertia member movable relatively to said shaft, elastically deformable means, friction means substantially covered by said deformable means and associated with the shaft and the inertia member to resist relative movement of the latter, and resilient means enclosed by the inertia member and the deformable means to increase the friction of said friction means.

2. A vibration damper for a shaft having a hub member provided with a radially disposed flange, an inertia member movable relatively to said shaft, friction means associated with and disposed between the flange and the inertia member for resisting relative movement of the latter, axially disposed springs on the inertia member to increase the friction of the friction means, and elastically deformable means adapted to cooperate with said inertia member to enclose the friction means and said springs.

3. A vibration damper for a shaft having a hub member provided with a flange, friction devices engaging said flange, friction plates engaging said friction devices, and inertia member clamped on said friction plates and movable relatively to said shaft, said inertia member having axially disposed recesses arranged in a circular row, springs seated in said recesses and engaging the friction plates to ensure intimate engagement between the friction devices and the flange and said plates, and rubber means vulcanized to said plates and hub and engaging said inertia member to enclose the friction devices and springs.

4. A vibration damper for a shaft having a hub member provided with a flange, friction devices engaging said flange, friction plates engaging said friction devices, resilient cover means for said friction devices carried by said plates and hub, an inertia member having two annular parts clamped on said plates, and springs carried by the inertia member for applying pressure between the friction devices, said plates and said hub.

5. A vibration damper for a shaft having a flange carried by the shaft and an inertia member movable relatively thereto, friction means comprising plates carried by said inertia member, and friction devices disposed between said plates and the flange, coil springs carried by the inertia member and axially engaging said plates to increase the friction effect of said friction means, and resilient rubber means permanently secured to the plates and connected to the inertia member to yield in response to relative movement between the shaft and the inertia member, said rubber means forming with the plates and the inertia member an enclosure for said spring.

6. A vibration damper for a shaft having an inertia member movable relatively to the shaft, friction means associated with the shaft and inertia member to resist relative movement of the latter, elastic means deformable in response to said relative movement comprising a cover for said friction means, and spring means co-acting with said friction means to increase the friction devoloped thereby.

7. A vibration damper for a shaft having an inertia member movable relatively to the shaft, contacting friction members frictionally connected with said shaft and connected to said inertia member respectively, elastically deformable means forming a cover for said friction members, and springs for increasing the contact pressure between said friction members.

8. In a vibration damper for a rotatable shaft, the combination with an inertia member movable relatively to the shaft, of means comprising an elastically deformable element interposed between said inertia member and said shaft and serving to resist relative movement thereof, means whereby said deformable element is subjected both to shear and compression stresses on relative movement of said inertia member and shaft, and spring pressed means extending within said deformable element and associated with said shaft and inertia member for frictionally retarding relative movement of the latter.

9. In a vibration damper for a rotatable shaft, the combination with an inertia member movable relatively to the shaft, of an elastically deformable element connecting said inertia member and said shaft for rotation while permitting slight relative movement thereof, said element being operatively connected to said member and said shaft at spaced points, whereby relative movement of the member and shaft will apply shearing stress to said element, and being interposed between portions of said member and shaft adjacent as regards the shaft axis, whereby relative movement of the member and shaft will apply compressive stress to said element and means comprising friction elements and springs acting to increase the friction therebetween extending within said deformable element and associated with said shaft and inertia member for frictionally retarding relative movement of the latter.

In testimony whereof I affix my signature.

WALTER R. GRISWOLD.